United States Patent [19]

Bowers

[11] Patent Number: 4,923,599
[45] Date of Patent: May 8, 1990

[54] WASTE WATER TREATMENT APPARATUS

[75] Inventor: Gregory S. Bowers, Green, S.C.

[73] Assignee: Southern Water Treatment Co., Inc.

[21] Appl. No.: 205,313

[22] Filed: Jun. 10, 1988

[51] Int. Cl.$^5$ ............................................ C02F 1/62
[52] U.S. Cl. ............................... 210/96.1; 210/143;
210/195.1; 210/205; 210/251; 210/258;
210/333.01; 210/340
[58] Field of Search ...................... 210/743, 745, 96.1,
210/108, 143, 195.1, 205, 206, 251, 257.1, 258,
323.2, 333.01, 340

[56] References Cited

U.S. PATENT DOCUMENTS

| | | | |
|---|---|---|---|
| 1,943,684 | 1/1934 | Martin et al. | 210/745 X |
| 3,605,775 | 9/1971 | Zaander et al. | 210/745 X |
| 3,618,766 | 11/1971 | Morey | 210/745 |
| 3,693,797 | 9/1972 | Topol | 210/96.1 |
| 4,170,553 | 10/1979 | Lang et al. | 210/745 X |
| 4,282,093 | 8/1981 | Haga et al. | 210/143 X |
| 4,345,996 | 8/1982 | Lindman et al. | 210/96.01 |

*Primary Examiner*—Tom Wyse
*Attorney, Agent, or Firm*—Dority & Manning

[57] ABSTRACT

Waste water treatment for the removal of heavy metals is optimized by continuously removing and filtering a sample flow of treated waste water subject to pH level control to determine the presence of remaining metals in solution to be precipitated. Filtering of the sample removes metals precipitated by pH level control. Optimized pH level control can cause precipitation of most non-chelated and/or non-complexed metals, so that controlled feeding of a precipitating agent to the treated waste water is effectively determined by only those metals remaining in solution, which are typically either chelated and/or complexed heavy metals. The filtered sample is injected with a diluted solution of the precipitating agent, and then a turbidity meter is used to determine the degree of turbidity of the injected clear sample. The resulting degree of turbidity corresponds to the level of precipitation caused by injection of the diluted precipitating agent. The precipitation level is in turn in direct correspondence with the level of remaining metals in solution. Differentiation between types of metals for control of feeding of the precipitating agent to the waste water permits optimized use of the precipitating agent, and minimized sludge production accompanying use of the precipitating agent.

24 Claims, 2 Drawing Sheets

WASTE WATER TREATMENT APPARATUS

BACKGROUND OF THE INVENTION

This invention concerns in general improved method and apparatus for waste water treatment, and in particular concerns the treatment of waste water containing heavy metals.

Industrial waste waters commonly include a variety of contaminants which require treatment (i.e. removal) even before the waste water can be discharged from the plant site. The nature of the waste water contaminants is in large part dependent on the commercial processes practiced in the plant. Accordingly, there is great variety in the nature of waste water contaminant problems. Moreover, the matrix (i.e., makeup) of waste water even at a given commercial site will usually vary, sometimes dramatically, with changes in production or the like.

Particular industries, for example such as those relating to metal plating, metal finishing, or circuit board manufacturing activities, generate waste water with heavy metals (e.g., copper, nickel, etc.) and other metals in solution with such waste water. The commercial activities themselves may inherently generate heavy metals which are chelated and/or complexed for purposes of the commercial activity (e.g., metal plating) itself. Chelating and/or complexing tends to cause such metals to remain in solution, and thus require special attention for their removal.

During the typical course of plant activity, heavy metal concentration in the waste water is highly variable. While concentration variations can in general be expected, monitoring of and reacting to specific variations is problematic. Concentrations of heavy metals may typically vary from a few parts per million to several hundred parts per million, even in a very short time, such as a matter of minutes.

Not only do concentration levels vary drastically, but extreme variations can be experienced with respect to the matrix (both in identity and nature, e.g., chelated versus non-chelated) of heavy metals present.

In general, it is known to add (i.e., feed) various precipitating agents to waste water to precipitate such heavy metals for their removal from the water. The amount of such precipitating agents required (i.e. consumed) in the course of precipitating such heavy metals of course depends on the degree of presence of such heavy metals in solution with the waste water. Since effective real time monitoring of heavy metal concentration levels has heretofore generally proven difficult, such treatment chemical feeding (i.e. the feed rate of precipitating agents) is typically set at a compromise level, such as for precipitating the maximum expected concentration of heavy metals. Such a compromise setting creates an excess amount of sludge, which sludge may often be classified as a hazardous waste. Moreover, since the cost of the treatment chemicals is not insignificant, wasteful overfeeding thereof is costly.

Operators have been known to attempt periodic checks to manually detect the level of metals entering the waste water (i.e., assess the expected concentrations), and adjust the chemical feed rate accordingly. However, such a manual adjustment merely alters the set feed rate in accordance with periodic reassessments of the anticipated maximum concentration, and does nothing to eliminate excess sludge production and excessive and costly chemical usage caused by differences between actual concentration levels and the anticipated maximums thereof. Moreover, short term spikes can still occur, meaning that inadequately treated waste water can be nonetheless discharged. Such occurrences are particularly problematic where applicable laws regulate the permissable discharge concentration levels, such as to certain fractional parts per million or certain parts per million.

In some industrial settings, anticipation of heavy metal concentrations in the waste water may be relatively less "predictable". For example, a totally unexpected occurrence of heavy metals in the waste water can go unchecked, thereby causing the plant to exceed permissible discharge levels. For example, maintenance personnel might empty mop buckets or the like containing chelated heavy metals picked up from the floor of the facility, which could cause a heavy metal concentration spike in the waste water at a time whenever commercial activity in the plant is nil, and precipitating agent feed pumps may be switched off. The plant is nonetheless responsible for its waste water discharge, though no effective continuous monitoring systems for preventing such undesirable discharges may be available.

It is generally known that certain metals in solution in waste water may be precipitated therefrom by controlling the pH level of the waste water. For example, non-chelated and non-complexed metals in particular may be in various degrees precipitated in such manner. Automatic controllers are generally available which function to probe the waste water for its pH level, and automatically pump treatment chemicals accordingly to the waste water so as to adjust its pH level within an established deviation from a pre-selected setpoint. One example of such a controller is the Model 5 proportional pH pump controller, made by Chem-Tech International, Inc., of 92 Bolt Street, Lowell, Mass., 01853. While such a controller may be effective for metals which may be precipitated through such pH inducement, heavy metals which are chelated and/or complexed generally will not be precipitated with such pH level control. Thus, the monitoring and treatment problems noted above persist, and may be compounded where a changing mix of chelated and non-chelated metals is presented for treatment.

Another aspect of waste water treatment problems where both such types of metals are in solution (i.e., which can and can not be practically precipitated through pH inducement) is that use of a precipitating agent can precipitate both such types of metals. However, unnecessary sludge production is caused by precipitating metals in such a manner which could have otherwise been precipitated through pH level control (as generally discussed above). Again, the amount of precipitating agent consumption is also a factor.

In addition to the availability of known pH level control generally outlined above, at least one other generally known method, involving a so-called oxidation reduction potential probe, attempts to address precipitating agent usage. Such a probe is typically used to detect the presence of excess (i.e. un-consumed) precipitating agent at a phase of a waste water treatment program after all the metal is removed. One particular limitation of such a system is that it cannot distinguish between, for example, chelated and non-chelated metals, and must therefore feed precipitating agent until there is an excess of such agent present in the water.

Feed control feedback also is derived from detected excess agent, not from information relative remaining metal in solution to be precipitated. Thus, there is no effective prevention of excess sludge generation or wasteful chemical usage.

Another limitation of a waste treatment system utilizing an oxidation reduction potential (ORP) probe is that the probe operation involves an electrical measurement which is affected by changes in the pH level of the waste water, the amount of total dissolved solids therein, and the amount of chelated metal in the waste water. Thus, an ORP probe system is inherently ineffective for use in providing close control of the feeding of chemical treatment solutions into waste water treatment systems.

SUMMARY OF THE INVENTION

The present invention addresses such drawbacks and shortcomings, and others, of prior waste water treatment techniques. Accordingly, it is a general object of the present invention to provide improved waste water treatment methods, and apparatus for practicing same. It is a more particular object to provide such improved waste water treatments relating to the removal of heavy metals.

It is a more general object to provide improved heavy metal waste water treatment which effectively minimizes sludge production and treatment chemical consumption.

In providing such improved method and apparatus, it is yet a further object of this invention to provide same with the ability to change a chemical treatment solution feed rate so as to automatically match varying demands of the waste water chemistry, thereby resulting in such reduced sludge generation and lower treatment chemical consumption. In providing such an automatically operative system, it is an object to provide a system which can be practically operated substantially continuously, and so as to greatly reduce a plant operators time needed to manage and maintain same.

It is another more general object of the present invention to provide for improved waste water treatment which permits continuous and automatic achievement of a predetermined setpoint of heavy metal concentration in solution (such as legislatively mandated levels in parts per million or fractions thereof). It is a more particular object to provide such a system which is effective in achieving such objects despite even wide variations in the heavy metal concentrations, such as may occur from entirely unanticipated dumps of relatively high heavy metal concentrations into the waste water flow.

It is another more particular object of the present invention to provide for improved heavy metal waste water treatment which is compatible for use with pH level control systems, so as to in combination therewith limit usage of the precipitating agent and limit the overall generation of sludge, particularly sludge designated as hazardous waste.

In providing such improved waste water treatment methods and apparatus, it is an object to provide for continuous practice thereof in conjunction with an otherwise continuously operating waste water treatment system, such as a system having a plurality of consecutive treatment stages.

It is yet another object of the present invention to provide such an improved waste water treatment system, which is effective for controling the consumption of a wide variety of available precipitating agents.

In connection with consumption monitoring and limiting, it is another object to provide a controller for precipitating agent feeding, even where such agent is used for an alternative commercial purpose, such as for a biocide (encountering and killing microbiological activity, or the like) for treating a given aqueous suspension. It is a particular object to provide such a controller effective for controlling the level of such a consumable agent used as a biocide in connection with a generally aqueous papermaking suspension or sugar-making suspension. Alternatively, an object is to utilize the present invention in controlling the level of a consumable biocide in cooling water of a cooling water tower.

It is yet another general object of the present invention to provide for improved waste water treatment which effectively distinguishes between metals in solution which are chelated and/or complexed, and those which are non-chelated and/or non-complexed, so as to enable efficient utilization of a precipitating agent for the chelated and/or complexed metals. It is a further object to provide for controlled feeding of such precipitating agent to the waste water to be treated, instead of merely allowing feeding of such precipitating agent at a calculated rate based on anticipated maximum heavy metal concentrations.

The foregoing objects and advantages, and others, of the present invention may be embodied in a variety of methods, apparatus, and devices in accordance with the present invention. Alternative embodiments of the present invention may include various combinations of features in accordance with this invention, which features are discussed in greater detail below. Moreover, such embodiments may in the alternative be embodied as either practice of a method including such features as various steps or the like of such method, or embodied as an apparatus, a device, system or the like including components or means in correspondence with such combination of features.

Practiced as either a method or apparatus, one exemplary embodiment of the present invention includes the combination of present features for waste water treatment, comprising: conducting pH treatment of a controlled body of waste water for substantially precipitating non-chelated and non-complexed metals therefrom; sampling such pH-treated waste water, and substantially removing solid precipitated metals therefrom to provide a clear sample; testing such clear sample for the presence of any remaining metals in solution therein; and feeding a given precipitating agent to the controlled body of waste water in response to the presence of such remaining metals so as to substantially precipitate same. Both pH-precipitated and non-pH-precipitated metals are substantially precipitated from the body of waste water for removal therefrom, with minimized feeding of said precipitating agent.

Other exemplary embodiments of this invention (concerning both process and apparatus) are directed to the combined features of: continuously sampling waste water and removing from such sampling already precipitated metals so as to provide a clear sample; injecting a given precipitating agent into such clear sample so as to render same turbid to a degree determined by the reactionary precipitation of metals formerly remaining in solution in such clear sample; detecting the degree of turbidity of such injected sample, so as to ascertain a proportional corresponding degree to which metals remain in solution in the waste water; and providing a regulated flow of the given precipitating agent to the waste water in correspondence with the ascertained degree to which metals remain in solution in such waste water. Such regulated flow enables precipitation of heavy metals from the waste water substantially without over-feed of the precipitating agent, which minimizes sludge production accompanying use of such agent.

Still another exemplary embodiment of this invention is directed to a waste water treatment process for (or system for) reducing metals in solution with such waste water to a predetermined level, such process including (or such system including means for): providing multiple treatment stages for waste water including at least one stage constituting a main treatment tank having inflow thereto and outflow therefrom relative other treatment stages in the process; (pH level control means for) controlling the pH level in said main treatment tank so as to precipitate those metals therefrom amenable to pH-induced precipitation at the controlled level of such pH; (testing means for) continuously monitoring the main treatment tank for remaining non-precipitated metals; and based on such monitoring, (control means for) selectively administering a given precipitating agent to the main treatment tank for precipitating such remaining metals to a degree adequate to reduce metals in solution with such waste water to the predetermined level.

Such monitoring and administering steps (testing and control means) further include: (tubing means for) establishing a continuous sample flow from the main treatment tank; (liquid-solid separation means for) filtering the continuous sample flow to remove precipitated metals therefrom so as to provide a relatively clear continuous sample flow; (precipitating agent injection pump means for) continuously injecting a relatively diluted amount of the given precipitating agent into the relatively clear continuous sample flow at an injection point in such flow; (turbidity meter means for) detecting the turbidity of such flow at a point downstream from such injection point, the degree of such turbidity varying in proportion with the degree to which additional metals are precipitated by the injecting of the diluted given precipitating agent; and (precipitating agent controlled pump means for) actuating administering of such given precipitating agent to the main treatment tank responsive to the degree of detected turbidity.

Such administering of the precipitating agent is in accordance with a monitored need for additional precipitation measures other than pH level control, which minimizes sludge production inherently generated by use of such precipitating agent.

Still further embodiments of the present invention relate to a method of, and corresponding device for, controlling the level of a consumable agent present in a given generally aqueous medium having solids in solution therein, such agent being consumed while such given medium is involved in a continuous process, such embodiments including: establishing a sample flow from the given medium; filtering the sample flow established from the given medium, for substantially removing precipitated solids therefrom to provide a clear sample flow; providing a given indicator solution which reacts in such sample flow so as to create precipitation therefrom of any solids remaining in solution in the given medium; injecting the given indicator solution into the clear sample flow; sensing the degree of turbidity of such sample flow downstream from such injecting, which degree of turbidity is in direct proportion with the degree of precipitation brought on by injecting of such given indicator solution into such flow; and replenishing the consumable agent in the given medium in proportion to the sensed degree of turbidity of such sample flow. In such embodiments, the level of such consumable agent in the given medium can be monitored and regulated as desired relative the continuous process in which the given medium is involved.

While specific exemplary embodiments are disclosed above, and discussed in greater detail below, those of ordinary skill in the art will appreciate various modifications to features and aspects of this invention which may be practiced in accordance with the broader teachings thereof. Such modifications include, but are not limited to, variations in particular means, steps, or features, various combinations thereof, and various substitution of equivalent features and means, or the like. It is intended by virtue of present reference thereto that all such modifications and variations come within the spirit and scope of this invention.

BRIEF DESCRIPTION OF THE DRAWINGS

A full and enabling disclosure of the present invention, including the best mode thereof, is set forth below, in conjunction with reference to the accompanying figures, in which.

Figure 1:
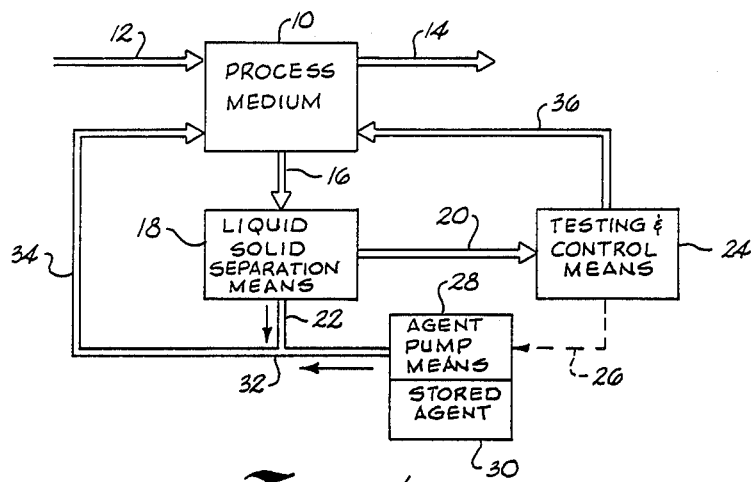
FIG. 1 comprises a block diagram representation of one embodiment in accordance with the present invention.

Repeat use of reference characters throughout the following specification and accompanying figures is intended to represent same or analogous features, elements, or aspects of this invention.

DETAILED DESCRIPTION OF THE PREFERRED EMBODIMENTS

In conjunction with the following description of exemplary embodiments of this invention, it is to be understood that features and aspects of this invention may be variously practiced in combination with a variety of waste water treatment systems, not all of which are necessarily shown nor explicitly mentioned hereinafter. However, specific exemplary embodiments are presented herewith and discussed in detail below to provide those of ordinary skill in the art with an adequate disclosure of this invention for practicing same, either as shown and discussed herein or as adapted by such persons from time to time for conformance with their particular requirements.

As relates to waste water treatment, one aspect of this invention as represented by present FIG. 1 is that a filtered sample of waste water is obtained and monitored for determining controlled feeding of a given precipitating agent. Such methodology, even if readily accomplished with individual components which independent of one another are previously known, advantageously permits chemical feed operations based on information about metals remaining in solution to be precipitated.

With reference to FIG. 1, a process medium 10 is generally representative of a waste water treatment system, or at least a portion thereof such as a main treatment tank. The present invention is equally well practiced with a fixed body of waste water, such as may be contained in process medium 10, or (as is also typical in many waste water treatment systems) a process medium having a continuous inflow 12 and outflow 14. Such inflow and outflow may represent input to a waste water treatment system and discharge therefrom, respectively, or may represent flow connections with relative upstream and downstream stages of a multi-stage treatment system.

Where process medium 10 represents a body of waste water having metals in solution therewith to be precipitated as treatment thereof, such controlled body of waste water is preferably sampled, such as with sample flow 16. Sample flow 16 may be variously established, such as with a gravity feed tube or pipe. Alternatively, sampling flow or means 16 may incorporate use of a recirculating pump (not shown). Those of ordinary skill in the art will understand that various gravity feed and/or pump feed arrangements may be used interchangeably at different points in the systems disclosed herewith, without departing from the spirit and scope of the present invention.

Sampling means 16 establishes a preferably continuous sample flow from waste water in process medium 10. As discussed above, pH level control (not shown) or other preliminary treatment(s) may be practiced in process medium 10 (or stages upstream thereof) for precipitating non-chelated and/or non-complexed metals therefrom. The sample flow established with sampling means 16 includes such already precipitated metals in the treated waste water. Such treated waste water passes through liquid-solid separation means 18 which substantially removes such already precipitated metals from the sample flow so as to provide a clear sample. Such clear sample is present in flow line 20, while flow line 22 provides return means for recirculating the sample flow to process medium 10.

The clear sample forming output 20 of separation means 18 has substantially all of the already precipitated metals removed therefrom, but may contain further metals in solution therewith. For example, should process medium 10 contain waste water with chelated and/or complexed heavy metals in solution therein, pH treatment will not typically precipitate such heavy metals. Since such heavy metals remain in solution, they are passed through separation means 18 and continue in solution with the clear sample present in flow line 20. Thus, testing and control means 24 are advantageously operative on and actuated by only those metals which remain in solution after obtention of the above-mentioned clear sample. Where the pH level in process medium 10 is controlled with conventional technology (examples of which are given above in the Background portion of this specification) for effectively precipitating non-chelated and/or non-complexed metals, testing and control means 24 will be operative on and actuated by essentially only heavy metals which are chelated and/or complexed.

As represented by electric control line 26, testing and control means 24 operate a precipitating agent controlled pump means 28 for selectively feeding stored precipitating agent 30 to process medium 10 (i.e., the controlled body of waste water) via flow paths (e.g., tubing) 32 and 34. Essentially, testing and control means 24 tests the clear sample present in flow line 20 for the presence of any remaining metals in solution therein, and then feeds a given precipitating agent 30 to the controlled body of waste water (i.e., process medium 10) in response to the presence of such remaining metals so as to substantially precipitate same. Thus, various types of metals are substantially precipitated from the waste water in process medium 10, with controlled, minimized feeding of stored precipitating agent 30. Waste water passed through testing and control means 24 is also returned to process medium 10, via flow path 36.

By taking a sample from the controlled body of waste water, and obtaining a clear sample therefrom (preferably a continuously filtered sample), controlled feeding of the precipitating agent may be predicated upon metals remaining in solution. By proper (preferably optimum) control of the pH level in process medium 10, such remaining metals in solution will substantially comprise only chelated and/or complexed heavy metals. Therefore, operation of testing and control means 24 on such clear sample enables effective control of stored agent 30 for feeding thereof to process medium 10 for precipitating chelated and/or complex metals therefrom, while minimizing sludge production and precipitating agent overfeed.

Figure 2A:
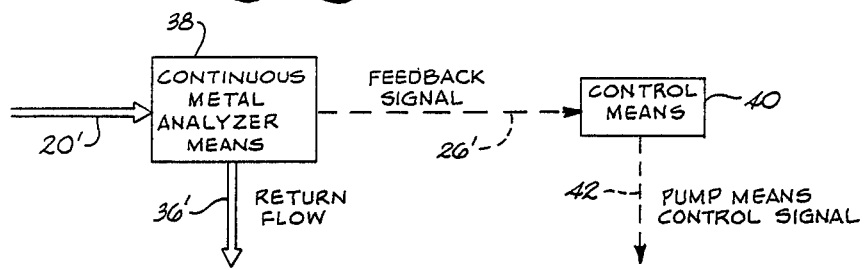
FIG. 2a comprises a block diagram representation of one embodiment in accordance with the present invention of the testing and control means of FIG. 1.
Figure 2B:
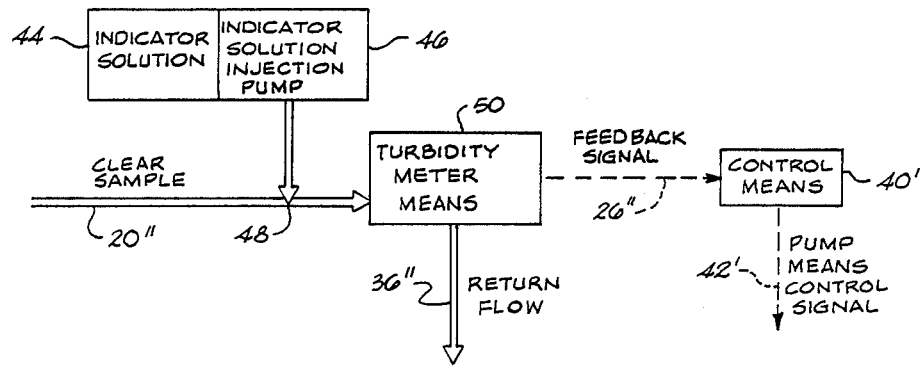
FIG. 2b comprises a block diagram representation of an alternative embodiment to that of FIG. 2a, for the testing and control means of present FIG. 1.

FIGS. 2a and 2b are diagrammatic representations of alternative embodiments for testing and control means 24 of present FIG. 1. In the embodiment of FIG. 2a, the clear sample present in flow line 20' is passed through a continuous metal analyzer means 38. A return flow is again established to process medium 10 (or some other portion of the waste water treatment system) through flow line 36', so that the waste water itself remains in a closed treatment system. The continuous metal analyzer means may comprise any one of a variety of self-contained devices available in the marketplace, such as for testing for the presence of nickel, copper, or the like. One example is Model 61700-02 Trace Pump Analyzer by Hach Company, Loveland, Colo. 80539.

Details of analyzer means 38 do not form particular aspects of the present invention, and hence need not be specifically discussed in connection with an adequate disclosure of this invention. Such analyzer means produces a feedback signal 26' to which feeding control means 40 is responsive for in turn outputting a pump means control signal 42 for operation of a precipitating agent controlled pump means, such as pump means 28 of FIG. 1. Feeding control means 40 may comprise a variety of self-contained controllers available on the marketplace. One example of such a controller is the AMF-Cuno Sentrol controller, a precision control product available from the company at 400 Research Parkway, Meridan, Conn., 06450.

Setpoint or proportional control operations may alternatively be practiced. In setpoint control, a precipitating agent is fed to process medium 10 only whenever the detected level of metals in solution in the clear sample exceeds a predetermined setpoint. In proportional control, the amount of precipitating agent fed to the process medium is modulated in proportion with the degree of detected metals in solution in such clear sample.

A variety of chemical metering pumps are available on the market for operation with control means, under either setpoint control or proportional control operations. For example, the 1200P and 12000PHO series chemical pumps, available from Chem-Tech International, Inc., at 92 Bolt Street, Lowell, Mass., 01853, are made for use with the Sentrol controller noted above.

FIG. 2b illustrates an alternative embodiment for testing and control means 24, for use instead of the continuous metal analyzer means 38 of present FIG. 2a. In such alternative embodiment, the clear sample present in flow line 20" is injected with (preferably continuously) an indicator solution. Stored indicator solution 44 is fed by indicator solution injection pump means 46 into flow line 20" at an injection point 48 therein. While a variety of indicator solutions may be used, such solution preferably comprises the same precipitating agent which comprises stored agent 30 in present FIG. 1. In particular, the indicator solution may comprise a diluted strength of such precipitating agent.

Whenever a precipitating agent is applied (or fed) to the clear sample in flow line 20", metals remaining in solution in the waste water contained in such flow line (which as discussed above in connection with optimized pH level control are likely to be chelated and/or complexed heavy metals) react by being precipitated. Such precipitation turns the clear sample turbid to a degree corresponding to the degree that such precipitation occurs. Such degree of precipitation in turn directly corresponds with the amount of metal remaining in solution available to the precipitated. Thus, downstream from injection point 48 (where indicator solution 44 is fed into the sample flow in flow line 20"), turbidity (e.g. brownness or cloudiness) of the continuous sample flow may be detected for determining the corresponding degree to which metals remain in solution in the treated waste water (i.e. process medium 10).

Turbidity meter means 50 is used for detecting the degree of turbidity caused by injection of the indicator solution (i.e. diluted precipitating agent), for outputting a feedback signal 26" for input to feeding control means 40'. Such control means 40' may be substantially the same as control means 40 in the embodiment of FIG. 2a, and hence itself outputs a pump means control signal 42' analogous to signal 42.

A variety of turbidity meters are available in the marketplace, and may be utilized as turbidity meter means 50 in accordance with the present invention. An example of such a generally available turbidity meter is Model 1720C Turbidimeter by Hach Company, P.O. Box 389, Loveland, Colo. 80539. Similar to the embodiments of FIGS. 2a and 1, a return flow path 36" from the turbidity meter means ensures that all the waste water remains in a closed system, i.e., is returned to process medium 10 or elsewhere in the treatment system.

By testing a clarified or filtered sample, whether with the embodiment of present FIG. 2a or present FIG. 2b or some equivalents thereof, a continuous process is provided which enables controlled feeding of a precipitating agent to the process medium to be based on the heavy metal concentration remaining in solution in such process medium. By so distinguishing between different types of metals in solution, use of the precipitating agent may be minimized, resulting in minimized sludge production and lowest chemical cost. Furthermore, by selection of the feedback signal characteristics and other operating parameters, the invention may be practiced for maintaining a certain turbidity level, and hence maintaining a corresponding heavy metal concentration in the process medium.

Various precipitating agents are available in the marketplace, and may be practiced in accordance with the present invention. One example of one of the preferred precipitating agents is sodium dimethyldithiocarbamate (hereinafter "DTC"). Another exemplary preferred precipitating agent is sodium borohydride. Examples of other chemicals useful in the removal of chelated and/or complexed heavy metals are: ferrous sulfate, sodium hydrosulfite, starch xanthate, sodium sulfide, magnesium oxide, and parasulfate.

Those of ordinary skill in the art will appreciate that a variety of factors may contribute to selection of a particular precipitating agent for use in accordance with the present invention. Additionally, use of a selected precipitating agent may dictate a particular regimen for preliminary pH level control in a multi-stage treatment system, as generally outlined above. For example, parasulfate is generally effective as a precipitating agent whenever the pH level is below 4. In order to precipitate those non-chelated and/or non-complexed metals which through pH level adjustment may be precipitated, the pH level of the waste water in one stage might be raised (such as up to 8.5 or 9), followed by a flocculation stage, followed by an adjustment of the pH level down to 4 or below to prepare for the controlled feeding of parasulfate. All such variations and modifications involving selection of particular precipitating agents, indicator solutions, corresponding pH level control, and the like are intended to come within the broader teachings of the present invention, with recognition that those of ordinary skill in the art may practice such modifications in accordance with this invention to accommodate their particular waste water treatment needs.

Figure 3:
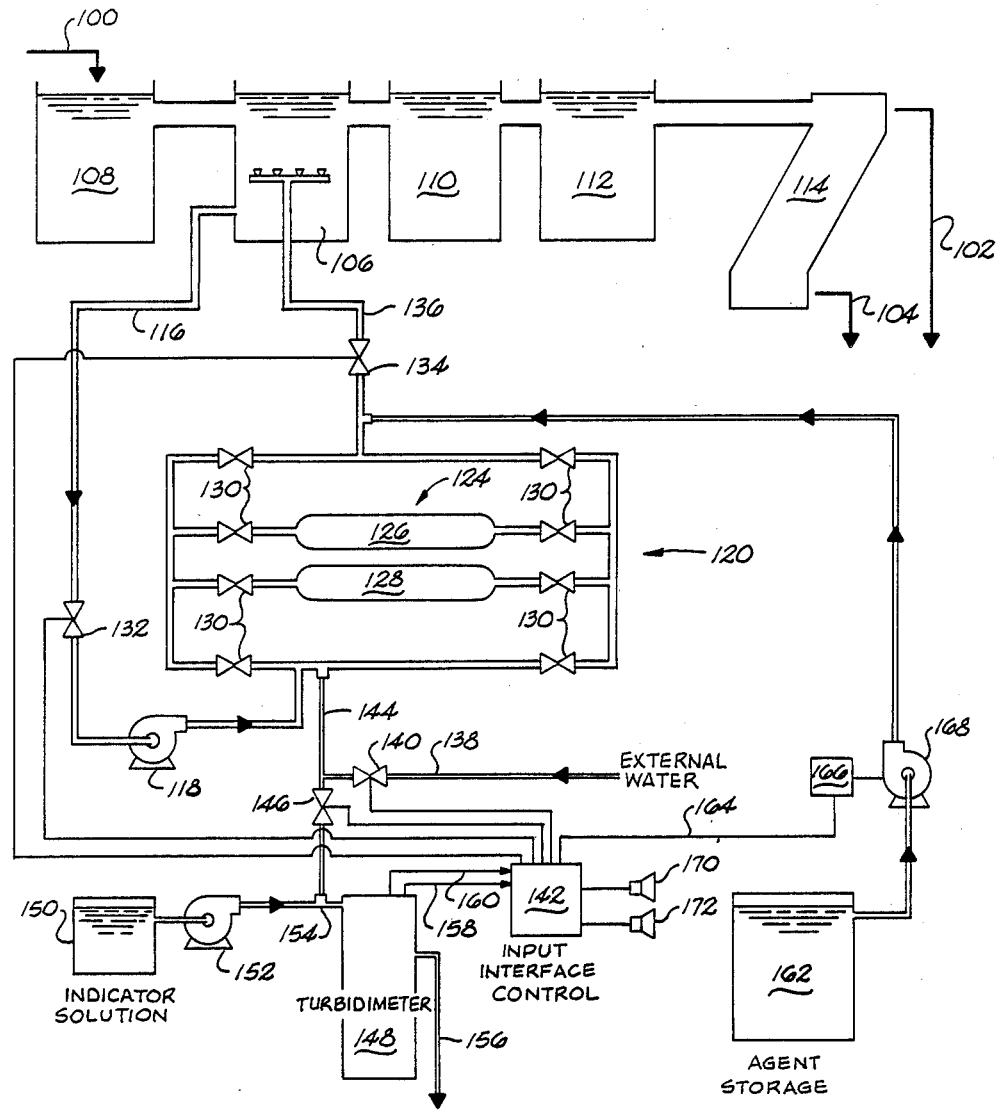
FIG. 3 comprises a diagrammatical view of a multi-stage waste water treatment system incorporating heavy metal waste water treatment features in accordance with the present invention.

Another exemplary presently preferred embodiment in accordance with the present invention is disclosed hereinafter with reference to FIG. 3. Such FIG. 3 represents a waste water treatment process or system having a plurality of consecutive stages. Such multiple stage systems are generally known, and typically provide a continuous treatment facility accommodating an inflow 100 of collected waste water (such as gathered from various points about a commercial plant), and outputs including for example treated effluent 102 which may be connected to a commercial sewer, and sludge 104 which may be further processed in a press or the like.

In the multi-stage process represented in present FIG. 3, a main treatment tank 106 corresponds generally with process medium 10 of present FIG. 1 (i.e., main treatment tank 106 constitutes one source of waste water from which a sample may be withdrawn in accordance with the present invention). In the representative multi-stage system of present FIG. 3, situated upstream of such main treatment tank 106, and providing inflow thereto, is an equalization stage 108. Downstream from main treatment tank 106, and accepting outflow therefrom, are consecutively a coagulation stage 110, a flocculation stage 112, and a clarification stage 114. Operations of such stages 108, 110, 112, and 114, and other typical treatment system stages, are generally known to those of ordinary skill in the art and do not form particular aspects of the present invention; hence, detailed explanation thereof is not required herewith for a complete understanding of this invention.

While in one aspect the present invention concerns the overall combination of the process and system represented by the entirety of FIG. 3, in another aspect, the present invention separately concerns the combination of apparatus illustrated in FIG. 3 beneath stages 106–114 (and the corresponding method of operation thereof).

Such apparatus includes tubing means 116 for establishing a preferably continuous sample flow from main treatment tank 106. While a gravity-dependent flow system may be utilized in whole or in part, a recirculating pump 118 is illustrated in FIG. 3 as representing pump-assisted alternatives to such gravity dependency.

Similar to operation of the embodiment of present FIG. 1, the continuous sample flow is passed through liquid-solid separation means 120 to substantially remove any already precipitated solids therefrom. Such solids most likely may comprise non-chelated and/or non-complexed metals already precipitated by pH level control treatment of the waste water in main treatment tank 106 (as discussed above in connection with such pH level control in process medium 10 of present FIG. 1).

In the exemplary embodiment of present FIG. 3, the basic aspect of separation means 120 is filter means 124, which as illustrated preferably comprises a pair of tubular filters 126 and 128 variously interconnected for passage of the continuous sample flow of waste water therethrough. While alternative filter means may be practiced in accordance with the present invention, ultra-filtration members comprising filter modules, such as the "Microdyn" membrane modules made by ENKA, are preferred since they permit relatively continuous filtering of the sample flow. The minimum particle trapping size of tubular filters 126 and 128 may vary, but preferably falls generally in a range from about 0.2 microns to about 5 microns. The selection of a trapping particle size may vary depending on circumstances of a given installation, and is thus in part left to preference or needs of particular users.

As illustrated in present FIG. 3, separation means 120 further includes a plurality of controllable valves 130 which may be controlled and operative, in combination with the tubing interconnecting same, for directing the sample flow of treated waste water through tubular filters 126 and 128 in either longitudinal direction thereof. Controllable valves 130 may be either manually or automatically controlled for periodically reversing the direction of flow through filters 126 and 128 (i.e., periodically backwashing the filters), which advantageously contributes to relatively prolonged periods of continuous operation without blockage of the filtering membranes of such tubular filters.

Furthermore, controllable valves 132 and 134, upstream and downstream respectively of separation means 120, may be appropriately controlled for isolating separation means 120 from sample tubing means 116 and return flow tubing 136 (which is part of the closed system for the waste water in the apparatus of the present invention). Once so isolated at controlled periodic intervals, clean external water from an available source such as tubing 138 may be supplied through a further controlled valve 140 for backwashing tubular filters 126 and 128, which also prevents clogging thereof.

Intermittent or periodic backwashing may occur under the control of an input interface control means 142, as illustrated. Such control means 142 comprises a centralized control means (such as a Sentrol controller, discussed above) for the FIG. 3 embodiment, and is further connected with other features and elements thereof for receiving feedback signals and outputting control signals, as discussed hereinafter.

Continuously filtered sample flow from separation means 120 is fed via flow line 144 through another controlled valve 146 (which is also controlled by control means 142 during backwashing for isolation of separation means 120) towards turbidity meter 148. Prior to passing through turbidity meter 148 (or turbidimeter), indicator solution 150 (such as a diluted strength of a precipitating agent such as DTC) is injected, by an indicator solution injection pump means 152, into the filtered continuous sample flow at an injection point 154 thereof. Thus, as discussed in connection with the above-described exemplary embodiments of the present invention, turbidity meter 148 may detect the turbidity (i.e., cloudiness) of the filtered continuous sample flow at a point downstream from injection point 154, and determine therefrom the corresponding degree to which metals remain in solution in main treatment tank 106. Another return flow path 156 returns the sample flow to main treatment tank 106 after it is injected with the indicator solution and tested with the turbidity meter.

Turbidity meter 148 may comprise any generally available turbidity meter means, such as discussed above in connection with the exemplary embodiment of present FIG. 2b. Turbidity meter 148 provides output (or feedback) signals on lines 158 and 160, which signals ultimately provide for controlled pumping of stored precipitating agent 162 to main treatment tank 106. Control means 142, which actually receives and responds to the turbidity level feedback signals on lines 158 and 160, may comprise an adapted Sentrol controller, as discussed above in connection with control means 40 and 40' of FIGS. 2a, and 2b respectively. Use of a Sentrol controller, or its equivalents, in accordance with the present invention falls generally within the abilities of those of ordinary skill in the art, without further detailed discussion thereof.

Selectively operating under either setpoint control or modulated control, control means 142 outputs a pump means control signal via line 164 to a pump controller 166, which appropriately commands chemical feed pump 168 to feed precipitating agent 162 into return flow line 136. Thus, the precipitating agent 162 is controllably fed into main treatment tank 106 in accordance with the detected need for further precipitation of metals in solution in such main treatment tank, beyond the pH induced precipitation thereof discussed above.

While general features and operative characteristics of the present invention have been discussed above in conjunction with the exemplary embodiment of present FIG. 3, various particular operating parameters thereof may be selected by those of ordinary skill in the art for use in particular applications. For example, backwashing control may be initiated at selected intervals, such as a period of one minute every hour or the like.

Moreover, various alarms 170 and 172 may be utilized for signalling an operator whenever the system fails to maintain the concentration of metals in solution in treatment tank 106 to within a predetermined maximum level. Actuation of the alarms may also be accompanied by various other automatic operations. For example, sensing of a defined excessive turbidity level might cause shut off of inflow waste water into tank 106 until the situation is rectified. Alarms can be triggered whenever separation means 120 becomes clogged such that the flow rate therein is less than a predetermined minimum level. Such information could be obtained with a conventional flow rate meter (not shown) or the like variously incorporated into the tubing of separation means 120, or at the inflow or outflow thereof. Typically, a continuous sample flow rate may be generally within a range of from about 1 to about 20 gallons per minute.

Depending upon applicable regulations, or other factors, the predetermined maximum setpoint concentration of metals in solution in main treatment tank 106 may be established generally in a range of from about 0 to about 5 parts per million. Likewise, the controlled level of pH in such treatment tank 106 may be varied depending on a variety of factors, such as the anticipated waste water matrix. For example, where waste water entering main treatment tank 106 contains anywhere from about 10 to about 300 parts per million of nickel, copper, or the like, a controlled level of pH in a range of 9 to 10 may precipitate most of the metal which is not chelated and/or complexed.

The most effective pH level which results in the least amount of sludge production will vary depending on the nature of the metals in solution, as understood by those of ordinary skill in the art. For example, copper will precipitate naturally at a pH of about 8.3, while zinc naturally precipitates at a level of about 10.2, and nickel precipitates at a level of 10.75. Particular controlled use of the precipitating agent in accordance with the present invention can be used to compensate for pH levels which deviate from ideal for particular types of metals. Such deviation can uncontrollably occur for a variety of reasons, including for example, lack of knowledge about the types of metals present in the waste water and/or continuous changing in the mix of metals in solution.

In addition to variety in the various features discussed above, alternative structural constructions may be practiced in accordance with the present invention. For example, while two tubular filters are illustrated in parallel in the exemplary embodiment of present FIG. 3, fewer or greater numbers of such filters (or substitutes therefor) may be practiced. Moreover, alternative backwashing arrangements may be practiced. For example, a plurality of selectable banks of tubular filters may be set up, with alternative sample flow therethrough so that "unused" tubular filters may in the meantime be thoroughly backwashed for subsequent use.

In addition to the foregoing modifications and variations, and others that will be readily appreciated by those of ordinary skill in the art, the present invention may be used in conjunction with processes other than waste water treatment. For example, one preferred precipitating agent, DTC, is also effective as a biocide, for killing organic or microbiological activity in various aqueous suspensions. Microbiological activity in cooling water towers can cause a variety of problems, such as inhibited heat transfer, and excessive corrosion, slime or algae growth. Similar growth activity in aqueous suspensions in papermaking or suspensions in sugarmaking are also problematic.

The present invention may be practiced for controlling the feeding level of the consumable agent in such processing, which is variously consumed such as by precipitating metals in solution, or by encountering and killing organic or microbiological growth present in a given aqueous suspension. For example, a given indicator solution comprising heavy metals may be injected into a clear sample flow, in accordance with the present invention, for determining the degree to which the consumable agent remains in the aqueous medium. In other words, the role of heavy metals is essentially reversed in some applications from that discussed above in connection with FIGS. 1-3. With this invention, the level of the biocide in the suspension can be monitored and regulated as desired without affecting the continuous process in which the aqueous suspension is otherwise involved.

These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to be limitive of the invention so further described in such appended claims.

What is claimed is:

1. Apparatus for waste water treatment, comprising:
   pH treatment means for conducting pH treatment of a controlled body of waste water for substantially precipitating non-chelated and non-complexed metals therefrom;
   sampling means for sampling said pH treated waste water;
   separation means for substantially removing solid precipitated metals from said sampled pH treated waste water to provide a clear sample;
   testing means for testing said clear sample for the presence of any remaining metals in solution therein; and
   feeding means for feeding a given precipitating agent to the controlled body of waste water in response to the presence of said remaining metals so as to substantially precipitate same, whereby both pH-precipitated and non-pH-precipitated metals are substantially precipitated from such body of waste water for removal therefrom, with minimized feeding of said precipitating agent.

2. Apparatus as in claim 1, wherein:
   said testing means include continuous metal analyzer means for outputting a feedback signal indicative of the presence of any remaining metals in solution in said clear sample; and
   said feeding means includes feed control means, responsive to said continuous metal analyzer means feedback signal, for feeding said precipitating agent to the controlled body of waste water.

3. Apparatus as in claim 1, wherein:
   said separation means includes filter means for removing solid precipitated metals from pH treated waste water passed therethrough; and
   said testing means includes indicator solution injection pump means for continuously injecting an indicator solution to said clear sample, which solution renders such sample turbid to a degree which is in proportion to the presence of metals in solution in such sample; and further includes monitoring means for monitoring the degree of the turbidity of such injected sample.

4. Apparatus as in claim 3, wherein:
   said indicator solution comprises a diluted strength of said given precipitating agent; and
   said non-pH-precipitated metals which precipitate in reaction to said indicator solution comprise at least one of heavy metals which are chelated and heavy metals which are complexed.

5. Apparatus as in claim 3, further comprising:

backwashing means for periodically backwashing said filter means so as to prevent clogging of same; and recirculating means for recirculating said clear sample to the controlled body of waste water after operation thereon by said testing means.

6. Apparatus as in claim 1, wherein:

said testing means further includes means for determining the degree to which any remaining metals in solution are present in said clear sample; and said feeding means includes means for operatively responding to said testing means for actuation thereby only whenever such determined degree of the presence of the remaining metals in solution exceeds a predetermined level.

7. Apparatus as in claim 1, wherein:

said testing means further includes means for determining the degree to which any remaining metals in solution are present in said clear sample; and said feeding means includes means for operatively responding to said testing means for actuation thereby modulated proportionately to such determined degree of the presence of remaining metals in solution in said clear sample.

8. Apparatus as in claim 1, wherein said sampling means, separation means, and testing means are generally operative continuously, while said feeding means is intermittently operative responsive to operation of said testing means for determining the presence of any remaining metals in solution in said clear sample.

9. Apparatus for removing heavy metals from waste water, comprising:

sampling means for continuously sampling such waste water;

separation means for removing from such sampling already precipitated metals so as to provide a clear sample;

injection means for injecting a given precipitating agent into said clear sample so as to render same turbid to a degree determined by the reactionary precipitation of metals formerly remaining in solution in said clear sample;

turbidity detection means for detecting the degree of turbidity of said injected sample, so as to acertain a proportional corresponding degree to which metals remain in solution in the waste water; and precipitating agent flow control means, responsive to said turbidity detection means, for providing a regulated flow of said given precipitating agent to the waste water in correspondence with the ascertained degree to which metals remain in solution in such waste water, whereby such regulated flow enables precipitation of heavy metals from the waste water substantially without over-feed of said precipitating agent, which minimizes sludge production accompanying use of such agent.

10. Apparatus as in claim 9, wherein:

said sampling means includes tubing means for establishing a sample flow from the waste water;

said separation means includes filter means for filtering from said sample flow of waste water precipitants larger than a predetermined size, which flow is directed therethrough by said tubing means;

said injection means includes injection pump means for injecting a relatively diluted strength of said given precipitating agent into said sample flow; and wherein said apparatus further comprises return flow means for returning said sample flow to the waste water, after operation of said injection means and turbidity detection means thereon.

11. Apparatus as in claim 10, further comprising:

pH-level treatment means for substantially precipitating non-chelated and non-complexed metals from the waste water from which said sample flow is established with said tubing means, which precipitated metals are substantially removed from such sample flow by said filter means; and backwashing means for periodically backwashing said filter means with reverse flow therethrough so as to prevent clogging thereof with such pH-treatment precipitated non-chelated and non-complexed metals, so as to permit relatively prolonged periods of operation of said filter means without other substantial maintenance thereof.

12. Apparatus as in claim 9, wherein said precipitating agent flow control means includes setpoint control means for permitting flow of said given precipitating agent only whenever the degree of turbidity detected by said turbidity detection means is above a predetermined set-point.

13. Apparatus as in claim 9, wherein said precipitating agent flow control means includes modulated control means for providing controlled flow of said given precipitating agent in proportion with the detected degree of turbidity determined by said turbidity detection means.

14. A waste water treatment system for reducing metals in solution with such waste water to a predetermined level, said system including:

a plurality of consecutive treatment stages for waste water including at least one stage constituting a main treatment tank having inflow thereto and outflow therefrom relative other treatment stages in said system;

pH-level control means for controlling the pH level in said main treatment tank so as to precipitate those metals therefrom amenable to pH-induced precipitation at the controlled level of such pH;

testing means for continuously monitoring said main treatment tank for remaining non-precipitated metals; and control means, responsive to said testing means, for selectively administering a given precipitating agent to said main treatment tank for precipitating such remaining metals to a degree adequate to reduce metals in solution with such waste water to said predetermined level; wherein said testing means and control means include tubing means for establishing a continuous sample flow from said main treatment tank, liquid-solid separation means for filtering said continuous sample flow to remove precipitated metals therefrom so as to provide a relatively clear continuous sample flow, precipitating agent injection pump means for continuously injecting a relatively diluted amount of said given precipitating agent into said relatively clear continuous sample flow at an injection point in said flow, turbidity meter means for detecting the turbidity of said flow at a point downstream from said injection point, the degree of such turbidity varying in proportion with the degree to which additional metals are precipitated by said injecting of said diluted given precipitating agent, and precipitating agent controlled pump means, responsive to said turbidity meter means, for pumping said given precipitating agent to said main treatment tank responsive to the degree of detected turbidity, whereby such controlled pumping of said precipitating agent is in accordance with the detected need for additional precipitation measures other than said pH level control, which minimizes sludge production inherently generated by use of said precipitating agent.

15. A system as in claim 14, wherein:

said tubing means comprises relatively small diameter tubing for establishing a relatively low flow rate continuous sample flow; and wherein said system further includes a preliminary equalization stage situated upstream from said main treatment tank and providing said inflow thereto; and treatment stages situated downstream from said main treatment tank and receiving said outflow therefrom, such downstream stages consecutively including coagulation, flocculation, and clarification stages.

16. A system as in claim 14, wherein said given precipitating agent comprises sodium dimethyldithiocabarmate.

17. A system as in claim 14, wherein said given precipitating agent comprises sodium borohydride.

18. A system as in claim 14, wherein:

said pH-level control means is operative for maintaining the level of said pH in said main treatment tank generally below 4;

said other treatment stages of said system include upstream from said main treatment tank an equalization stage followed by a flocculation stage; and said given precipitating agent comprises parasulfate.

19. A system as in claim 14, wherein:

said separation means includes a pair of tubular filters, interconnected with a plurality of controllable valves for directed flow therethrough of said continuous sample flow in a selected longitudinal direction of said tubular filters; and said control means further includes means for controlling operation of said valves so as to intermittently reverse the longitudinal flow direction within said tubular filters, and/or admit reverse flow direction water thereto from a clean external source, for backwashing said tubular filters.

20. A system as in claim 14, wherein said control means includes set point control means for operating said precipitating agent controlled pump means so that only degrees of detected turbidity above a predetermined set point actuates feeding of said given precipitating agent to said main treatment tank.

21. A system as in claim 14, wherein said control means includes modulation means for operating said precipitating agent controlled pump means so that actuation thereof is modulated proportionately to the degree of detected turbidity, for proportionately actuating feeding of said precipitating agent to said main treatment tank in accordance with said detected need therefor.

22. A device for controlling the level of a consumable agent present in a given generally aqueous medium having solids in solution therein, such agent being consumed while such given medium is involved in a continuous process, said device including:

sampling means for establishing a sample flow from said given medium;

filter means for filtering said sample flow established from said given medium, for substantially removing precipitated solids therefrom to provide a clear sample flow;

storage means for storing a given indicator solution which reacts in said sample flow so as to create precipitation therefrom of any solids remaining in solution in said given medium;

injection means for continuously injecting said given indicator solution from said storage means into said clear sample flow at an injection point thereof;

turbidity meter means for sensing the degree of turbidity of said sample flow downstream from said injection point thereof, which degree of turbidity is in direct proportion with the degree of precipitation brought on by injecting of said given indicator solution into said flow; and controllable pump means, responsive to said turbidity meter means, for replenishing said consumable agent in said given medium in proportion to the sensed degree of turbidity of said sample flow, whereby the level of said agent in said given medium can be monitored and regulated as desired relative the continuous process in which said given medium is involved.

23. A device as in claim 22, wherein:

said given medium comprises waste water to be treated, and said solids comprise metals in solution therewith to be removed therefrom to about a predetermined level remaining in solution as such treatment of said waste water;

said consumable agent comprises a predetermined precipitating agent, with consumption thereof occurring during precipitation from said waste water of metals in solution therewith; and said indicator solution comprises a relatively diluted strength of said predetermined precipitating agent.

24. A device as in claim 22, wherein:

said given medium comprises an aqueous suspension for use in manufacturing a product; and said consumable agent comprises a biocide, with consumption thereof occurring as such biocide encounters and kills organic growth in said aqueous suspension.

* * * * *